United States Patent Office 3,284,768
Patented Nov. 8, 1966

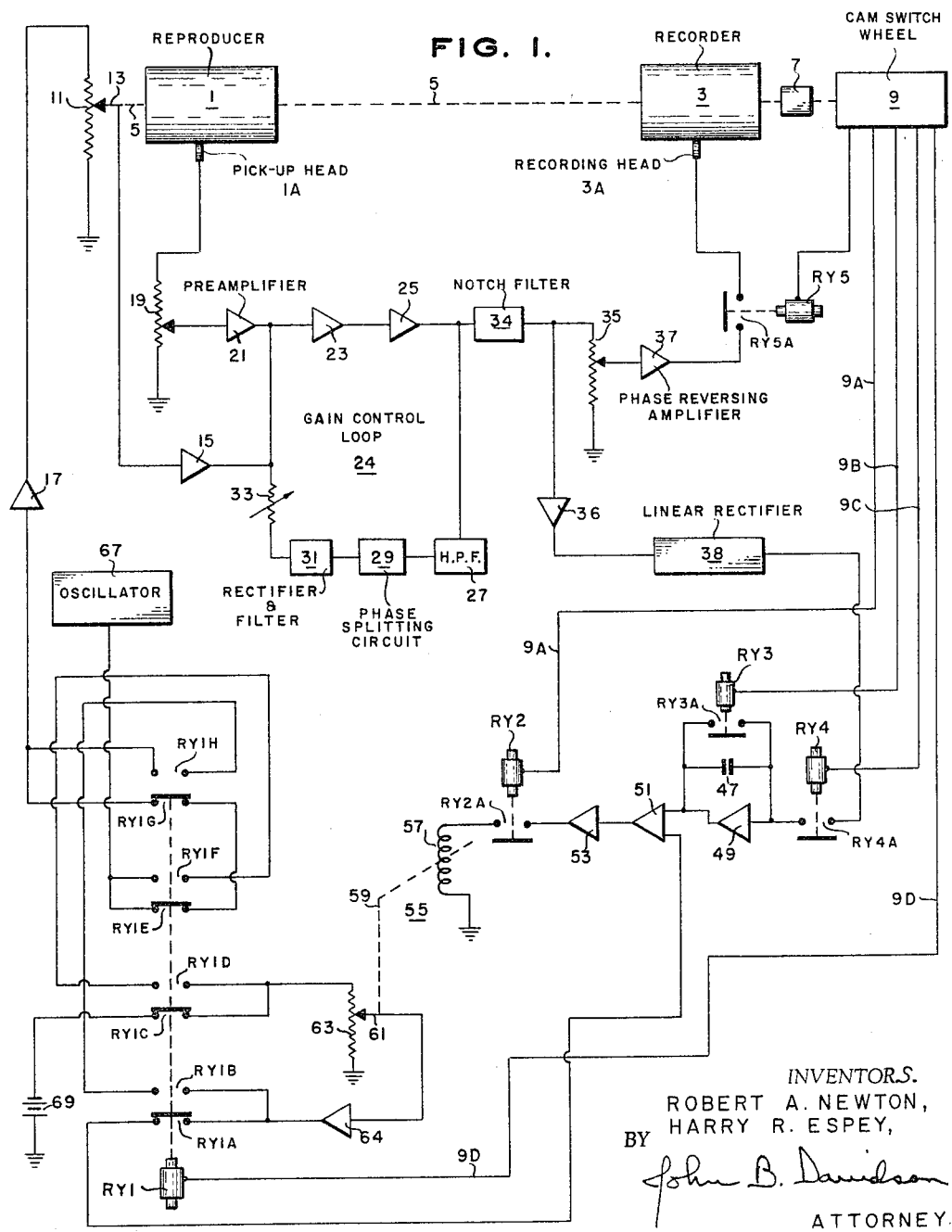

3,284,768
NORMALIZING A SEISMOGRAM DATA TRACE
Robert A. Newton and Harry R. Espey, Houston, Tex., assignors, by mesne assignments, to Esso Production Research Company, Houston, Tex., a corporation of Delaware
Filed May 6, 1964, Ser. No. 365,296
3 Claims. (Cl. 340—15.5)

This invention relates to geophysical prospecting utilizing the seismic technique, and more particularly to a technique for eliminating and reducing the effects of variable seismic impulse parameters and variable seismic wave detecting parameters on the traces of a seismogram.

The general method of geophysical exploration utilizing seismic waves comprises the steps of initiating a seismic impulse at or near the surface of the earth, and recording signals generated by geophones as a result of the earth's movements at one or more points more or less spaced from the point of origin of the impulse. The recordation must permit measurement of the time elapsing between the instant of the origination of the impulse and the generation of signals as the result of the subsequent earth movement. The original impulse will set up seismic waves that are transmitted through the earth. Any discontinuity or variation of struction with the earth will reflect and/or refract a portion of the energy in the waves so that a recording of the signals from the receiving points will comprise a number of arriving waves, each derived from the original impulse and each depending from the others in time of arrival, magnitude, and wave shape, or all three.

As the result of variations in seismic wave impulse parameters and variations in detecting and recording parameters (these may be lumped or near surface effects), the data traces resulting from generation and detection of seismic waves as set forth above will vary both in amplitude and phase, with changes from one impulse point to another, and with changes from one detecting location to another. Adjacent traces may vary considerably even though the same information concerning the geologic column traversed by seismic waves is contained therein. It is desirable to "normalize" seismic traces; i.e., to remove from each trace the effects of variable shot point parameters and variable recording and detecting parameters.

The variable seismic impulse parameters referred to above are concerned with the size of the dynamite charge used to produce the seismic impulse and the effectiveness of the coupling between the energy source and the earth. The variable detecting parameters have to do with variations in geophone construction, effectiveness of the coupling between the earth and the geophone, and the like.

In the past it has been customary to apply automatic gain control in the recordation of data traces produced from electrical signals resulting from detection of seismic waves. While the use of automatic gain control on playback of reproducible seismograms will eliminate undesired amplitude variations in the data traces, it will result in the loss from the data traces of amplitude information related to the geologic column.

Objects and features of the invention not apparent from the above discussion will become evident upon consideration of the following detailed description of the invention taken in connection with the accompanying drawing, wherein:

FIG. 1 is a schematic electrical diagram of data trace processing apparatus in accordance with the invention; and FIG. 2 is a diagram illustrating the relative times of actuation of the various relays illustrated in FIG. 1.

With reference now to FIG. 1, there is illustrated a seismogram reproducing apparatus 1 connected by a common shaft 5 to the variable tap 13 of a potentiometer 11, to a recorder 3 for recording electrical signals as data traces, and to a cam switch wheel 9 through speed-reducing mechanism 7. The data trace reproducer 1 may be any of a number of commercially available apparatuses for reproducing one or more data traces of a seismogram as one or more corresponding electrical signals. Preferably, data trace reproducer 1 is of the type making use of a magnetic tape secured to a drum transport mechanism driven by an electrical motor integral therewith. In FIG. 1 there is illustrated a pickup head 1A for detecting a data trace previously recorded on the recording medium (e.g., a magnetic tape). Manifestly, the reproducing apparatus may have more than one pickup head and may be utilized in accordance with usual practice. The data trace reproducer 1 must be adapted to reproduce the data trace through first and second consecutive reproduction cycles without destroying the quality of the trace. By "reproduction cycle" is meant one complete reproduction of a previously recorded seismic signal (e.g., the output signal of a geophone). Recorder 3 likewise may be any of a number of commercially available apparatuses for recording electrical signals as data traces. The recording may be either on magnetic tape or on a visual recording medium. If a visual recording medium is used, the recordation may be in the form of a wiggly trace, a variable density trace, a variable area trace, or any other forms well known to the art. The recorder 3 is provided with a recording head 3A corresponding to the reproducing head 1A. If such is convenient, the shaft 5 interconnecting the reproducer 1 and the recorder 3 may be dispensed with, and the tape or other recording means for reproducer 1 may be mounted on the same drum as the tape or other recording means for the recorder 3. This is in accordance with usual practice and will not be further discussed herein.

Interconnecting the reproducing head 1A and the recording head 3A is an amplifying channel including a variable gain amplifier means for amplifying the electrical signal produced by recording head 3A. As illustrated, the variable gain amplifier comprises a preamplifier 21, first and second series-connected amplifiers 23 and 25, a notch filter 34, and a phase-reversing amplifier 37. The input of preamplifier 21 is connected to reproducing head 1A through a potentiometer 19, the tap of the potentiometer being connected to the input circuit of the amplifier 21. The amplifiers 23 and 25 comprise two components of a gain control loop 24 which also includes a high pass filter 27, a phase splitting circuit 29, a rectifier and filter 31, and a variable resistance element 33 for introducing an adjustable amount of attenuation into the loop. Fixed frequency oscillator 67, which may produce an electrical signal in the range of 3 kilocycles, is coupled to the input of amplifier 23 through preamplifiers 17 and 15, the potentiometer 11, and various contacts of relay RY1 as described below. The output of amplifier 17 is connected across potentiometer 11 and the input circuit of amplifier 15 is connected to the tap 13 of the potentiometer. The control output signal from oscillator 67 is injected into the gain control loop 24 and, at the input of amplifier 23, is mixed with the seismic signal from preamplifier 21 so that the output of amplifier 25 comprises a carrier signal of the frequency of oscillator 67 linearly added to the low frequency seismic signal from preamplifier 21. The low frequency component of the signal is eliminated by high pass filter 27. The phase splitting circuit 29 and the rectifier and filter 31 produce a D.C. signal, the magnitude of which is controlled by the amplitude of the output signal from amplifier 15. This, in turn, is controlled by the position of tap 13 which is varied through a reproduction cycle of the reproducer 1 in accordance with a predetermined program. Thus, compensation may be made for a programmed gain control apparatus such as is frequently used in the seismic art. Apparatus of the nature described above is illustrated in U.S. Patent No. 2,838,742—McManis, and will not be further described herein.

The output signal of amplifier 25 is applied to notch filter 34 which eliminates the component thereof having the frequency of oscillator 67. The output of the notch filter 34 is applied to recording head 3A through potentiometer 35, amplifier 37, and contact RY5A of relay RY5. In addition, the notch filter output signal is applied to a linear rectifier 38 through an amplifier 36. The function of the linear rectifier is to produce a full wave rectified output signal for application to integrating amplifier 49 whereby a signal is derived indicative of the time integral of the absolute amplitude of the output signal from the variable gain amplifier. The output signal from rectifier 38 is connected to the input of integrating amplifier 49 through the normally-open contact RY4A of relay RY4. The integrating amplifier 49 includes the usual integrating capacitor 47 which is connected to normally-open contact RY3A of relay RY3 so as to be discharged thereby when the contact is closed.

The output signal from integrating amplifier 49 is applied to one of the input circuits of a difference amplifier 51 having at least two input circuits and an output circuit. The other input circuit of difference amplifier 51 is connected to the variable tap 61 of potentiometer 63 through an amplifier 64 and the normally-closed contact RY1A of relay RY1. The signal for application to the second input circuit of amplifier 51 is derived either from oscillator 67 through normally-open contacts RY1F and RY1D, or from a constant potential source 69 (e.g., a battery) through normally-closed contact RY1C. Oscillator 67 is connected across potentiometer 63 through contacts RY1F and RY1D. Battery 69 is connected across potentiometer 63 through contact RY1C. The position of tap 61 on potentiometer 63 varies in accordance with the output signal of the difference amplifier 51. The output signal of the amplifier drives a servo mechanism which, as illustrated, comprises a meter potentiometer 55. The meter potentiometer includes an actuating winding 57 for varying the position of tap 61 through a mechanical linkage 59 in accordance with the current flowing through the winding. The actuating winding 57 of the meter potentiometer 55 is coupled to the output of amplifier 51 through a current amplifier 53 and the normally-open contact RY2A of relay RY2. The meter potentiometer may be of the type manufactured by Computer Instrument Company of Hempstead, New York, and designated as Model CP.

The sequence of operations of relays RY1, RY2, RY3, and RY4 is controlled by a number of cam actuated switches in the cam switch wheel 9, which switches are coupled to the respective actuating windings of the relays through lines 9A, 9B, 9C, and 9D. The cam wheel 9 is driven by the same motor that drives the reproducer 1 and recorder 3 through a speed-reducing mechanism 7 such that one complete operating sequence of the various relays requires two complete reproduction cycles of the data trace reproducer 1. In other words, one operating sequence of the cam switch wheel requires two complete revolutions of the data trace reproducer 1 and the recorder 3. The sequence of operations of the various relays as determined by the cam switch wheel 9 is illustrated in FIG. 2. As shown, the relay RY4 is actuated over the first alternate reproduction cycles of the reproducer 1 to close contact RY4A. Relay RY2 is momentarily actuated at the beginning of each reproduction cycle to close contact RY2A. Relay RY3 is momentarily actuated only at the beginning of alternate first reproduction cycles to close contact RY3A. Relay RY1 is actuated over substantially the entirety of second alternate reproduction cycles to close contacts RY1B, RY1D, RY1F, and RY1H, and to open normally-closed contacts RY1A, RY1C, RY1E, and RY1G.

The operation of the apparatus described above is as follows. Assume that the data trace reproducer 1 is actuated so as to reproduce a given seismic trace on the recording medium transported thereby over two complete reproduction cycles. On the first reproduction cycle, contact RY4A will be closed so that the rectified seismic wave signal from linear rectifier 38 is applied to integrator 49. Contact RY3A is initially closed at the very beginning of the first reproduction cycle so as to discharge the integrating capacitor 47 and set the integrating means to a reference level. Oscillator 67 is connected to amplifier 17 through contacts RY1E and RY1G so as to control the gain of the gain control loop 24 through potentiometer 11 driven by reproducer 1. Contact RY2A is momentarily closed so that potentiometer tap 61 is set at a zero or reference level. During the first reproduction cycle, the output signal from integrator 41 will progressively increase in accordance with the absolute amplitude of the seismic signal reproduced by head 1A over the first reproduction cycle. At the end of the first reproduction cycle, contact RY4A is opened and contact RY2A is momentarily closed. Immediately, the servo mechanism or meter potentiometer 55 will adjust the position of potentiometer tap 61 until the D.C. signals applied to the two input circuits of difference amplifier 51 are equal. Immediately after contact RY2A is again opened, contact RY1A is closed and remains closed for substantially the duration of the second reproduction cycle of reproducer 1. During this second reproduction cycle, relay RY5 is closed so that the output signal of the gain control loop 24 and the notch filter 34 is applied to the recording head 3A. During the second reproduction cycle, the gain of the gain control loop is controlled by the position of the tap 61 on potentiometer 63 inasmuch as the output signal from oscillator 67 is applied to amplifier 17 through contacts RY1F, RY1D, potentiometer 63, amplifier 64, and contacts RY1B and RY1H. Amplifier 64 is a voltage follower. The purpose of it is to isolate potentiometer 63 from the difference amplifier 51, and also from amplifier 17 so that loading effects will be of no consequence. Thus, the absolute amplitude of the seismic signal determines the gain of the variable gain amplifier. The reproducing heads 1A and 3A may then be moved to process the other traces on the reproducible seismogram. When all of the traces of the seismogram have been processed, it will be found that the variables introduced into the originally recorded seismogram by the shotpoint parameters affecting amplitudes and the detecting parameters, will be virtually eliminated on the seismogram recorded by recorder 3.

It should be noted that the potentiometer 11 may be eliminated, if such is desired. The reason that the potentiometer is included is that on occasions the original recording of a seismogram is performed with apparatus including a variable gain amplifier, the gain of which is varied to compensate for the decay in amplitude of energy detected by geophones after the production of a seismic impulse. The potentiometer 11 operates as a function generator to produce an output signal which is an inverse function of the desired gain function used to control the seismic signal during the original seismic recordation. Thus, the output signal from notch filter 34 will be a corrected time variant gain function appropriate to the area of recording interest.

The invention is not necessarily to be restricted to the specific structural details, arrangement of parts, or circuit connections herein set forth, as various modifications thereof may be effected without departing from the spirit and scope of the invention.

What is claimed is:

1. Apparatus for normalizing a reproducible seismogram data trace comprising:
reproducing means having a pickup head, for reproducing a data trace as an electrical output signal through first and second consecutve reproduction cycles;

recording means having a recording head for recording as a data trace an electrical signal coupled thereto;

an amplifying channel coupling said reproducing means to said recording head including variable gain amplifier means for amplifying the electrical output signal from said reproducing means, the gain of said variable gain amplifier means being controlled in accordance with the amplitude of a control electrical signal coupled thereto;

integrating circuit means for producing an output signal indicative of the time integral of the absolute amplitude of an input signal thereto;

a difference amplifier having first and second input circuits and an output circuit, adapted to produce a signal in said output circuit thereof having magnitude and polarity indicative of the magnitude and polarity of the difference of the amplitudes of the signals applied to said first and second input circuits thereof;

a potentiometer having a variable tap;

servo means for connection to said difference amplifier, connected to said tap for moving said tap until zero differential voltage is applied to said difference amplifier;

coupling circuit means for coupling said variable tap to said difference amplifier second input circuit;

a reference voltage source;

a control signal source; and means connected to said reproducing means, to said coupling circuit means, to said control signal source, to said reference voltage source, and to said integrating circuit for connecting said integrating circuit to the output of said variable gain amplifier means during said first reproduction cycles of said reproducing means, connecting said reference voltage source across said potentiometer on first reproduction cycles of said reproducing means, connecting said control signal source across said potentiometer when said potentiometer is not connected to said reference voltage source, connecting said potentiometer tap to said variable gain amplifier means on second reproduction cycles of said reproducing means for controlling the gain thereof, momentarily connecting said servo means to the output of said difference amplifier at the beginning of each reproduction cycle of said reproducing means, and resetting said integrating means to a reference level at the beginning of each of said first reproduction cycle thereof.

2. The apparatus of claim 1 wherein said potentiometer and servo means therefor comprise a meter potentiometer.

3. Apparatus for normalizing a reproducible seismogram data tracing comprising:

reproducing means having a pickup head, for reproducing a data trace as an electrical output signal through first and second consecutive reproduction cycles;

recording means having a recording head for recording as a data trace an electrical signal coupled thereto;

an amplifying channel coupling said reproducing means to said recording head including variable gain amplifier means for amplifying the electrical output signal from said reproducing means, the gain of said variable gain amplifier means being controlled in accordance with the amplitude of a control electrical signal coupled thereto;

integrating circuit means for producing an output signal indicative of the time integral of the absolute amplitude of an input signal thereto;

a difference amplifier having first and second input circuits and an output circuit, adapted to produce a signal in said output circuit thereof having magnitude and polarity indicative of the magnitude and polarity of the difference of the amplitudes of the signals applied to said first and second input circuits thereof;

a potentiometer having a variable tap;

servo means for connection to said difference amplifier, connected to said tap for moving said tap until zero differential voltage is applied to said difference amplifier;

coupling circuit means for coupling said variable tap to said difference amplifier second input circuit;

a reference voltage source;

a control signal source;

first switch means for connecting said potentiometer tap to said difference amplifier second input circuit, connecting said control signal source to said variable gain amplifier means, and connecting said reference voltage source across said potentiometer when not actuated and, when actuated, connecting said tap to said variable gain amplifier means for controlling the gain thereof and connecting said contol signal source across said potentiometer;

second switch means for connecting the output of said difference amplifier to said servo means, when actuated;

third switch means for restoring the output of said integrating means to a reference level, when actuated;

fourth switch means for connecting the output of said variable gain amplifier means to said first input circuit of said difference amplifier, when actuated; and means for actuating said first switch means during said second reproduction cycle, momentarily actuating said second switch means at the beginning of each reproduction cycle, momentarily actuating said third switch means at the beginning of each first reproduction cycle, and actuating said fourth switch means during each first reproduction cycle.

References Cited by the Examiner

UNITED STATES PATENTS

| | | | |
|---|---|---|---|
| 2,835,746 | 5/1958 | Montgomery | 340—15.5 |
| 3,185,930 | 5/1965 | Crawford et al. | 340—15.5 |
| 3,188,575 | 6/1965 | Sheffet | 340—15.5 |
| 3,239,802 | 3/1966 | Sheffet | 340—15.5 |

BENJAMIN A. BORCHELT, *Primary Examiner.*

R. M. SKOLNIK, *Assistant Examiner.*